United States Patent [19]

Hulsebosch

[11] Patent Number: 5,802,456
[45] Date of Patent: *Sep. 1, 1998

[54] METHOD AND APPARATUS TO MITIGATE INTERFERENCE CAUSED BY AN OVERLAY COMMUNICATION SYSTEM

[75] Inventor: Thomas G. Hulsebosch, Palatine, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 602,411

[22] Filed: Feb. 16, 1996

[51] Int. Cl.$^6$ ..................................... H04B 1/12

[52] U.S. Cl. .................. 455/63; 455/451; 455/454; 455/466

[58] Field of Search ...................... 455/63, 62, 33.1, 455/34.1, 34.2, 33.4, 56.1, 67.1, 448, 450, 451, 452, 453, 454, 466, 509; 370/329, 330; 379/59, 60

[56] References Cited

U.S. PATENT DOCUMENTS

| | | | |
|---|---|---|---|
| 3,632,885 | 1/1972 | Herold | 455/34.2 |
| 4,144,496 | 3/1979 | Cunningham et al. | 455/33.1 |
| 4,914,651 | 4/1990 | Lusignan | 370/69.1 |
| 5,396,539 | 3/1995 | Slekys et al. | 379/59 |
| 5,402,523 | 3/1995 | Berg | 455/33.4 |
| 5,515,374 | 5/1996 | Atkinson | 370/80 |

Primary Examiner—Edward F. Urban
Assistant Examiner—Lee Nguyen
Attorney, Agent, or Firm—Kenneth A. Haas

[57] ABSTRACT

A method and apparatus for mitigating interference in a communication system caused by an overlay system. The overlay system and the communication system utilize preferred channels (201-207). The communication system first utilizes a group of communication "preferred" channels (205 and 207) when assigning a voice channel to a communication subscriber unit. Additionally, the overlay system first utilizes a group of overlay "preferred" channels (201 and 203) when assigning a voice channel (102) to an overlay subscriber unit.

8 Claims, 3 Drawing Sheets

METHOD AND APPARATUS TO MITIGATE INTERFERENCE CAUSED BY AN OVERLAY COMMUNICATION SYSTEM

FIELD OF THE INVENTION

The present invention relates generally to communication systems and, in particular, to mitigating interference caused by an overlay communication system.

BACKGROUND OF THE INVENTION

Communication systems are well known and consist of many types including land mobile radio, cellular radiotelephone, personal communication systems, and other communication system types. Within the communication system, transmissions are conducted between a transmitting device and a receiving device over a communication resource, commonly referred to as a communication channel. To date, the transmissions have typically consisted of voice signals. More recently, however, it has been proposed to carry other forms of signals, including data signals. For ease of operation, it is preferable to have the data transmission capability overlay the existing voice communication capability, such that its operation is essentially transparent to the voice communication system while still utilizing the communication resources and other infrastructure of the voice communication system.

One such data service associated with cellular radiotelephone communication systems is known as Cellular Digital Packet Data (CDPD). CDPD systems are well known in the art and described, for example, in the Cellular Digital Packet Data System Specification, Release 1.0, Jul. 19, 1993. The processing of digital packet data signals within the CDPD system is typically separate from the processing of voice signals in the cellular radiotelephone communication system. However, the CDPD system is usually integrated (overlaid) with the cellular infrastructure to utilize common equipment for transmission of digital packet data signals.

When the CDPD equipment is overlaid on the cellular infrastructure and its operation is essentially transparent to the cellular system, there is no real-time radio channel allocation coordination between the two. Thus, the CDPD system must be capable of identifying an unused voice channel on which to transmit so that it does not disrupt voice communications within the cellular system. However, even if the voice channel is unoccupied at the time CDPD transmission begins, it is possible that the cellular infrastructure will assign a cellular subscriber to the same voice channel. In this event, the CDPD equipment must quickly detect the presence of the cellular subscriber, terminate its transmission and seek out a new unoccupied voice channel on which to resume transmission, i.e., hop from the current voice channel to a new voice channel.

Cellular systems use various means to mitigate interference caused by active voice channels. One such method is to assign a particular group of channels to either an "A" or a "B" reuse group, and program cell sites to assign channels from one of the reuse groups prior to assigning channels from the other reuse group. If one cell assigns channels from group "A" for primary assignment, the adjacent set of cells will utilize channels from group "B" for primary assignment. This scheme reduces the amount of time that the same channel is used in adjacent cells during the non-busy hours, thus decreasing the amount of adjacent or cochannel interference in the communication system. Because the processing of digital packet data signals within the CDPD system is separate from the processing of voice signals in the cellular radiotelephone communication system, a hopping CDPD system can increase the amount of adjacent/cochannel interference on the voice channels by utilizing channels that are not in a site's primary group of channels.

Additionally, when the cellular system is busy (channels from both the "A" and "B" groups being utilized), a hopping CDPD system can still cause large amounts of interference to the cellular system. This occurs when there are very few free voice channels in a sector. Operation under this condition can cause a "race condition," were a CDPD mobile can not find the CDPD transmission before the CDPD transmission must hop off the channel. Therefore, when a CDPD transmission hops many times in a short time, a CDPD mobile may fail to find transmission and incorrectly conclude that it is out of the coverage area of the CDPD system. The CDPD mobile will then start looking for a CDPD transmission in adjacent sectors or cells. If the CDPD mobile finds another CDPD transmission and begins communication, a situation can occur where a CDPD mobile is close to one cellular voice cell but communicating at high power to an adjacent cell. Failing to communicate with the most optimal CDPD transmission can lead to various types of performance degradation to the nearby cell.

Thus a need exists for an apparatus and method for mitigating interference in a cellular communication system caused by a CDPD system.

DESCRIPTION OF A PREFERRED EMBODIMENT

Figure 1:
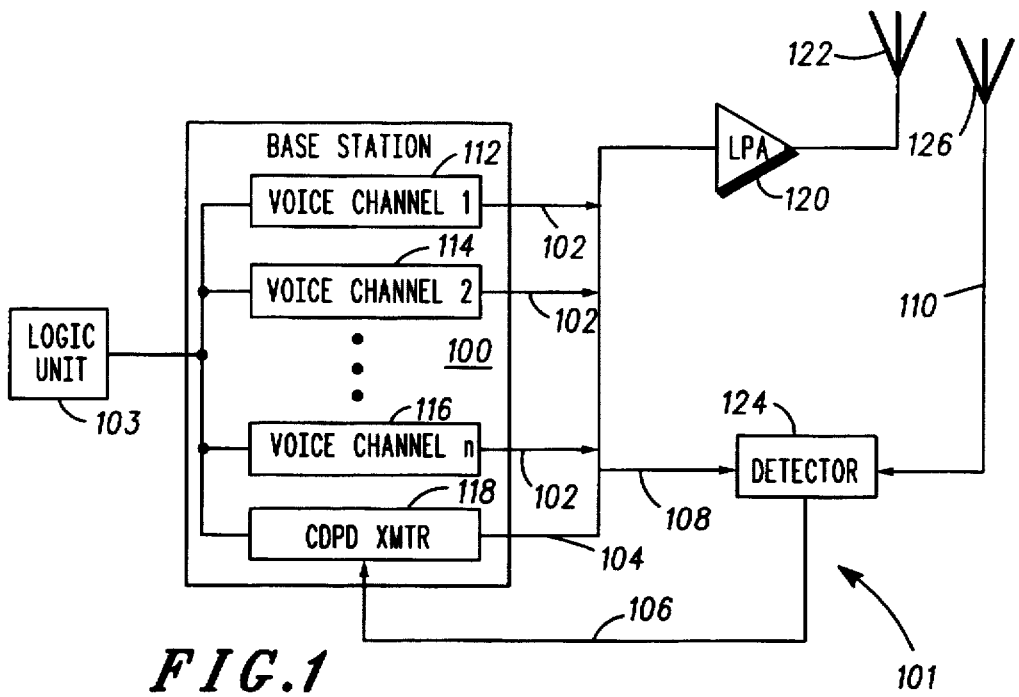
FIG. 1 is a block diagram illustrating a cellular system integrated with a CDPD system in accordance with a preferred embodiment of the present invention.

The present invention helps mitigate interference caused in a communication system by an overlay communication system by utilizing preferred channels in the communication system to reduce the amount of adjacent/cochannel interference. In this manner, the potential that a CDPD system will communicate with a non-optimal CDPD transmission is reduced. The communication system first utilizes a group of communication "preferred" channels when assigning a voice channel to a communication subscriber unit. Similarly, the overlay system will first utilize a group of overlay "preferred" channels when assigning a voice channel to an overlay subscriber unit. By utilizing overlay and communication preferred channels, adjacent/cochannel interference caused by the overlay system on the cellular system is reduced since the overlay system will typically operate on frequencies not utilized by the communication system. Also by minimizing the time that the communication system uses the overlay preferred channels the overlay system will be able to minimize the number of times hopping occurs, which in turn reduces the potential that a CDPD mobile will communicate with a non-optimal CDPD transmission.

Generally, the present invention encompasses a method to mitigate interference in a first and a second communication system caused by an overlay of the first and the second communication system. This is accomplished by creating a first group of channels to be used by the first communication system and a second group of channels to be used by the second communication system. The second communication system is prevented from communicating on the first group of channels and the first communication system is prevented from communicating on the second group of channels.

An alternative embodiment encompasses firstly determining by the first communication system or the second communication system, a statistic and comparing by one of the communication systems the statistic to a threshold. If the statistic is above the threshold then a first group of channels is created to be used by the first communication system and a second group of channels is created to be used by the second communication system. To mitigate interference in accordance with the invention, the second communication system is prevented from communicating on the first group of channels and the first communication system is prevented from communicating on the second group of channels.

An alternate embodiment encompasses creating a first group of channels to be primarily used by a first communication system and a second group of channels to be primarily used by the second communication system. The second communication system will utilize the first group of channels when there is no available channel existing on the second group of channels.

An alternate embodiment encompasses an apparatus comprising a first group of channels to be primarily used by a first communication system and a second group of channels to be primarily used by the second communication system. Finally, the apparatus comprises a logic unit coupled to the first and the second group of channels in order to determine a statistic. The logic unit comparing the statistic to a threshold and preventing the second communication system from communicating on the first group of channels when the statistic is greater than the threshold.

FIG. 1 illustrates a block diagram of a cellular system with an overlay system. In the preferred embodiment the overlay system is a CDPD system, but any communication system having overlay characteristics (e.g. macrocell/microcell) can be used. Base station 100 is suitably coupled, as is well known, to at least a mobile switching center (MSC), not shown, and potentially a base station controller (BSC), not shown, for providing cellular radiotelephone communication services to subscriber communication units operating within the communication system. Base station 100 includes a plurality of voice channel transceivers 112-116 for providing voice communication services to the subscriber units and a logic unit 103 for assigning preferred frequencies to the cellular system and the CDPD system. In addition, base station 100 includes a Cellular Digital Packet Data transceiver 118. Output transmission signals, either voice signals 102 from voice channel transceivers 112-116 or a digital packet data signal 104 from CDPD transceiver 118 are combined and amplified for transmission through linear power amplifier (LPA) 120 and transmitted over antenna 122. It should be understood that as used herein, a voice channel transceiver provides communication on a voice channel, which in the preferred embodiment, may refer to a pair of communication frequencies in a frequency division multiple access (FDMA) communication system or a timeslot in a time division multiple access (TDMA) communication system.

In the preferred embodiment, CDPD transceiver 118 is operable to receive digital packet data through the cellular system and to transmit the digital packet data within the cellular communication system on any one of the plurality of voice channels available. CDPD transceiver 118 is shown preferably integrated into base station 100. Its operation, however, is essentially stand alone and one of ordinary skill in the art will appreciate that it need not be integrated into base station 100. Moreover, although one CDPD transceiver is shown, a plurality of CDPD transceivers may be provided without departing from the fair scope of the present invention.

Shown in FIG. 1, hopping apparatus 101 includes a detector 124 for detecting the presence of voice signals on a voice channel presently being used by CDPD transceiver 118 and for generating a control signal 106 to CDPD transceiver 118 indicative of the presence of voice signals 102 on the voice channel. Detector 124 is shown as a separate element for clarity, however, it should be understood that it may be equally integrated into CDPD. If there is voice signals on the voice channel, CDPD transceiver 118 is operable to transfer, or hop, to a new voice channel for resumption of digital packet data transmission.

Detector 124 receives a first sample signal 108 which is a sample of the pre-transmitted output signal 104 of CDPD transceiver 118. Detector 124 also receives a second sample signal 110 which is a sample of the transmitted signal from CDPD transceiver 118 and the voice channel transceivers 112-116 via a sense antenna 126 which is physically located near antenna 122. Detector 124 makes a comparison of these signals and provides the control signal 106 to CDPD transceiver 118.

Figure 2:
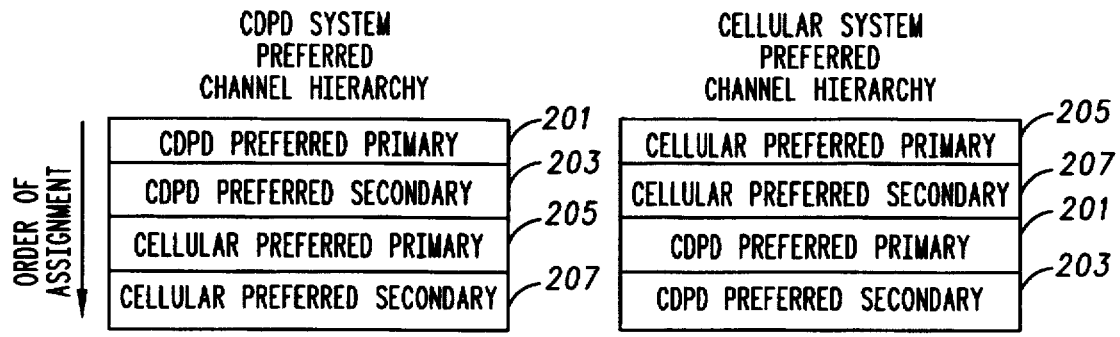
FIG. 2 is a block diagram illustrating a CDPD system and a cellular system channel allocation hierarchy in accordance with a preferred embodiment of the present invention.

FIG. 2 illustrates a CDPD system and a cellular system channel allocation hierarchy in accordance with a preferred embodiment of the present invention. In the preferred embodiment the available voice channels are divided into two groups. The cellular system first utilizes a group of cellular "preferred" channels 205 and 207 when assigning a voice channel to a cellular subscriber unit. Additionally, the CDPD system will first utilize a group of CDPD "preferred" channels 201 and 203 when assigning a voice channel to a CDPD subscriber unit. In the preferred embodiment, the cellular system will only assign a CDPD preferred channel 201 and 203 to a cellular subscriber unit when no cellular preferred channel 205 and 207 is available, and conversely, the CDPD system assigns a cellular preferred channel 205 and 207 to a CDPD subscriber when no CDPD preferred channel 201 and 203 is available. By utilizing overlay and communication preferred channels, adjacent/cochannel interference caused by the overlay system on the cellular system is reduced since the overlay system typically operates on frequencies not utilized by the communication system. Also by minimizing the time that the communication system uses the overlay preferred channels the overlay system will be able to minimize the number of times hopping occurs, which in turn reduces the potential that a CDPD mobile will communicate with a non-optimal CDPD transmission.

In order to reduce the adjacent/cochannel interference that the CDPD/cellular system causes to itself, the cellular preferred channels 205 and 207 and the CDPD preferred channels 201 and 203, are again divided into primary and secondary subgroups. In the preferred embodiment, cell sites are programmed to assign channels from the primary reuse group 201 and 205 prior to assigning channels from the secondary reuse group 203 and 207. If one cell assigns channels from group "A" for primary assignment, the adjacent set of cells utilizes channels from group "B" for primary assignment. For example, if a cell site is utilizing channels from group "A1" as its CDPD preferred primary channels 201 and channels from group "A2" as its CDPD preferred secondary channels 203, an adjacent cell cite utilizes channels from group "A2" as its CDPD preferred primary channels 201 and channels from group "A1" as its CDPD preferred secondary channels 203. This scheme reduces the amount of time that the same channel is used in adjacent cells during the non-busy hours, thus decreasing the amount of adjacent or cochannel interference in the communication system.

Figure 3:
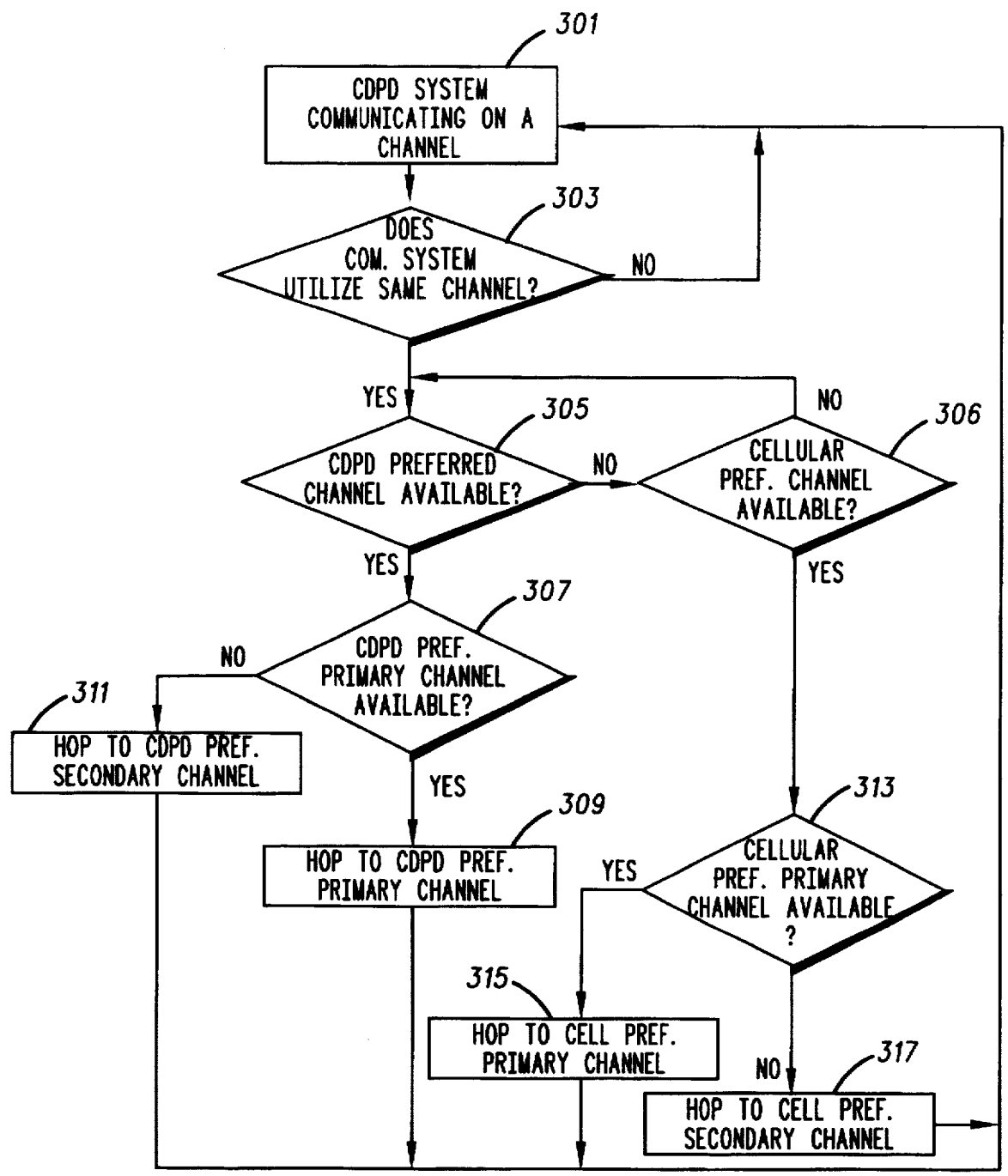
FIG. 3 is a logic flow diagram illustrating operation of a CDPD system in accordance with a preferred embodiment of the present invention.

FIG. 3 illustrates a logic flow diagram of operating a CDPD system in accordance with a preferred embodiment of the present invention. The logic flow begins at step 301 where the CDPD system is communicating on a voice channel (either CDPD preferred or cellular preferred). The CDPD system determines at step 303 if the cellular system is utilizing the voice channel that the CDPD system is currently utilizing. If the cellular system has not utilized a voice channel that the CDPD system is currently utilizing, the logic flow returns to step 301. If, at step 303, it is determined that the cellular system has utilized the voice channel that the CDPD system is currently utilizing, then at step 305 it is determined if a CDPD preferred channel is available. If it is determined at step 305 that a CDPD preferred channel is available, then at step 307, it is determined if a CDPD preferred primary channel is available. If it is determined at step 307 that a CDPD preferred primary channel is available, then at step 309, the CDPD system hops to a CDPD preferred primary channel and the logic flow returns to step 301. If at step 307 it is determined that a CDPD preferred primary channel is unavailable, then at step 311 the CDPD system hops to a CDPD preferred secondary channel, and the logic flow returns to step 301. If it is determined at step 305 that a CDPD preferred channel is not available, then at step 306, the system determines if a cellular preferred channel is available. If it is determined at step 306 that a cellular preferred channel is available, then at step 313, the system determines if a cellular preferred primary channel is available. If it is determined at step 313 that a cellular preferred primary channel is available, then at step 315, the CDPD system hops to a cellular preferred primary channel and the logic flow returns to step 301 otherwise at step 317, the CDPD system hops to a cellular preferred secondary channel, and the logic flow returns to step 301. If at step 306 it is determined that a cellular preferred channel is not available, the system will loop between steps 305 and 306 until a communication system channel becomes available.

By utilizing overlay and communication preferred channels, adjacent/cochannel interference caused by the overlay system on the cellular system is reduced since the overlay system typically operates on frequencies not utilized by the communication system. Also by reducing the time that the communication system uses the overlay preferred channels the overlay system is able to reduce the number of times hopping occurs, which in turn reduces the potential that a CDPD mobile will communicate with a non-optimal CDPD transmission.

Figure 4:
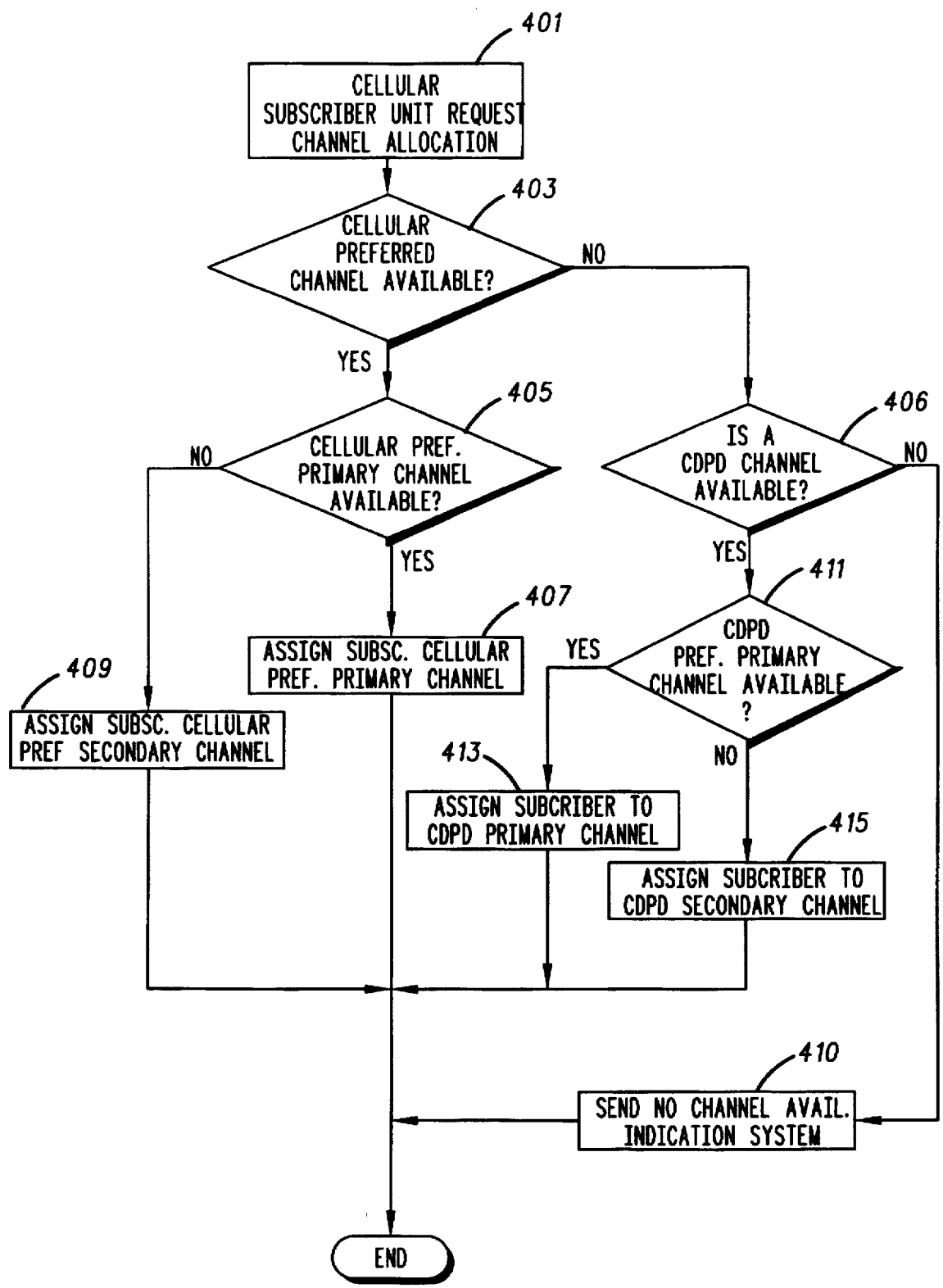
FIG. 4 is a logic flow diagram illustrating allocating a channel to a cellular subscriber in a cellular system containing an overlay system in accordance with a preferred embodiment of the present invention.

FIG. 4 illustrates a logic flow diagram of allocating a frequency to a cellular subscriber in a cellular system containing an overlay system in accordance with a preferred embodiment of the present invention. At step 401 a cellular subscriber unit requests a channel allocation. At step 403, it is determined if a cellular preferred channel is available. If it is determined at step 403 that a cellular preferred channel is available, then at step 405 the cellular system determines if a cellular preferred primary channel is available. If, at step 405, it is determined that a cellular preferred primary channel is available, then at step 407, the cellular subscriber is assigned to a cellular preferred primary channel and the logic flow ends at step 417, otherwise, at step 409, the cellular subscriber is assigned to a cellular preferred secondary channel and the logic flow ends at step 417. If at step 403 it is determined that a cellular preferred channel is not available, then at step 406, the cellular system determines if a CDPD preferred channel is available. If at step 406 it is determined that a CDPD preferred channel is available, then at step 411, it is determined if a CDPD preferred primary channel is available. If at step 411 it is determined that a CDPD preferred primary channel is available, then at step 413, the cellular subscriber is assigned to a CDPD preferred primary channel and the logic flow ends at step 417, otherwise at step 415 the cellular subscriber is assigned to a CDPD preferred secondary channel and the logic flow ends at 417. If it is determined at step 406 that a CPDD preferred channel is not available, the system will proceed to step 410 and indicate to the system that no channels are available to a mobile in that sector of the communication system.

Many CDPD systems are only able to operate in a "strict dedicated" or a "strict hopping" mode. In a strict dedicated mode, the CDPD system only operates on certain assigned frequencies without utilizing a hopping scheme. Conversely, in a strict hopping mode, the CDPD system utilizes a hopping scheme, but is unable to select CDPD preferred channels utilized in the preferred embodiment. In order to mitigate interference in CDPD systems that are only able to operate in a strict dedicated or strict hopping mode, an alternative embodiment is proposed.

Figure 5:
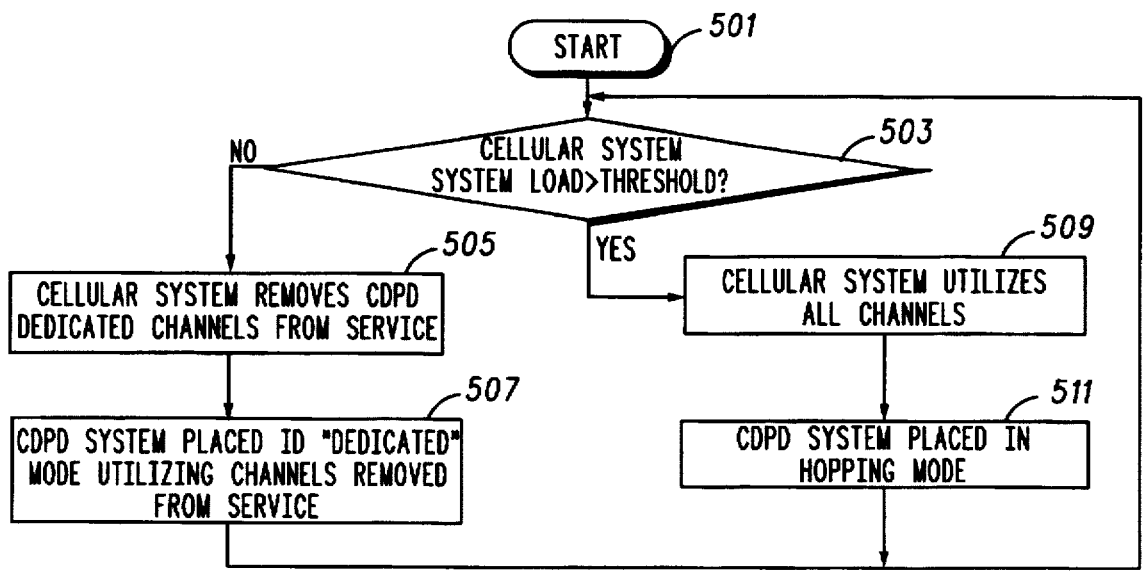
FIG. 5 is a logic flow diagram illustrating operation of a CDPD system an alternate embodiment of the present invention.

FIG. 5 illustrates a logic flow of operating a CDPD system an alternate embodiment of the present invention. The logic flow starts at step 501. At step 503, the load on the cellular system is checked to determine if it is above a certain threshold. In the preferred embodiment, the system load is a function of the time of day, with the threshold being set at a time equal to the busiest hours of the day, or a function of the system utilization, with the threshold set as a percentage of communication system channels occupied. If, at step 503, it is determined that the cellular system load is not greater than the threshold, then at step 505 the cellular system removes the CDPD channels from service, and at step 507, the CDPD system is placed into a "dedicated" mode where it utilizes the channels removed from the cellular service. Utilizing only dedicated channels for the CDPD system allows the CPDD system to operate at maximum efficiency since the CDPD mobile's can more easily locate the CDPD transmission. This increases the odds that an CDPD mobile is communicating with the best CDPD transmission in the system. If at step 503, it is determined that the cellular system load is equal to, or has exceeded the threshold, then at step 509 the cellular system utilizes all of its voice channels, and at step 511, the CDPD system is place in "hopping" mode. This embodiment reduces adjacent/cochannel interference caused by the overlay system on the cellular system since the overlay system will typically operate on frequencies not utilized by the communication system. Also by minimizing the time that the communication system uses the overlay preferred channels the overlay system will be able to minimize the number of times hopping occurs, which in turn reduces the potential that a CDPD mobile will communicate with a non-optimal CDPD transmission.

The descriptions of the invention, the specific details, and the drawings mentioned above, are not meant to limit the scope of the present invention. For example, while this invention has been described as applied to a CDPD system, it may be utilized by any overlay system. It is the intent of the inventors that various modifications can be made to the present invention without varying from the spirit and scope of the invention, and it is intended that all such modifications come within the scope of the following claims and their equivalents.

What is claimed is:

1. A method to mitigate interference in a first and a second communication system caused by an overlay of the first and the second communication system, wherein the first and the second communication systems utilize common equipment for transmission of signals, the method comprising the steps of:

creating a first group of channels utilized by the common equipment to be primarily used by the first communication system, the first group of channels comprising a first and a second subgroup of channels;

creating a second group of channels utilized by the common equipment to be primarily used by the second communication system the second group of channels comprising a third and a fourth subgroup of channels;

utilizing by the second communication system, the third subgroup of channels for primary assignment, the fourth subgroup of channels as secondary assignment, and the first group of channels for assignment when a statistic is above a threshold.

2. The method of claim 1, wherein the first communication system comprises a cellular communication system.

3. The method of claim 1, wherein the second communication system comprises a Cellular Digital Packet Data (CDPD) system.

4. An apparatus for mitigating interference in a first and a second communication system caused by an overlay of the first and the second communication system, the apparatus comprising:

a first group of channels to be used by the first communication system, the first group of channels comprising a first and a second subgroup of channels;

a second group of channels to be used by the second communication system, the second group of channels comprising a third and a fourth subgroup of channels;

a first transmitter associated with the first communication system, utilizing the first subgroup of channels for primary assignment, the second subgroup of channels as secondary assignment, and the second group of channels for assignment when a first statistic is above a first threshold; and a second transmitter associated with the second communication system, utilizing the third subgroup of channels for primary assignment, the fourth subgroup of channels as secondary assignment, and the first group of channels for assignment when a second statistic is above a second threshold.

5. The method of claim 4, wherein the first communication system comprises a cellular communication system.

6. The method of claim 4, wherein the second communication system comprises a Cellular Digital Packet Data (CDPD) system.

7. The method of claim 4, wherein the first statistic comprises a time-of-day statistic.

8. The method of claim 4 wherein the first statistic comprises a traffic loading measurement of the first communication system.

* * * * *